(12) United States Patent
Masui (10) Patent No.: US 10,423,372 B2
(45) Date of Patent: *Sep. 24, 2019

(54) INFORMATION PROCESSING APPARATUS, INFORMATION PROCESSING METHOD, AND NON-TRANSITORY COMPUTER READABLE STORAGE MEDIUM

(71) Applicant: FUJI XEROX CO., LTD., Tokyo (JP)

(72) Inventor: Takanori Masui, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/160,506

(22) Filed: Oct. 15, 2018

(65) Prior Publication Data

US 2019/0073167 A1 Mar. 7, 2019

Related U.S. Application Data

(63) Continuation of application No. 15/487,759, filed on Apr. 14, 2017, now Pat. No. 10,162,581.

(30) Foreign Application Priority Data

Sep. 8, 2016 (JP) .................... 2016-175187

(51) Int. Cl.
| | | |
|---|---|---|
| *G06F 15/00* | (2006.01) | |
| *G06F 3/12* | (2006.01) | |
| *G06K 1/00* | (2006.01) | |
| *H04L 29/12* | (2006.01) | |
| *H04N 1/00* | (2006.01) | |

(52) U.S. Cl.
CPC .......... *G06F 3/1231* (2013.01); *G06F 3/1222* (2013.01); *G06F 3/1238* (2013.01); *G06F 3/1287* (2013.01); *H04L 61/2571* (2013.01); *H04N 1/00127* (2013.01); *H04L 61/1511* (2013.01); *H04L 61/2015* (2013.01)

(58) Field of Classification Search
CPC .... G06F 3/1231; G06F 3/1222; G06F 3/1238; G06F 3/1287; H04N 1/00127; H04L 61/2571; H04L 61/1511; H04L 61/2015
USPC .............................. 358/1.1, 1.15, 1.14, 1.13
See application file for complete search history.

(56) References Cited

U.S. PATENT DOCUMENTS

| | | | |
|---|---|---|---|
| 10,162,581 B2 * | 12/2018 | Masui | ................... G06F 3/1222 |
| 2005/0207401 A1 | 9/2005 | Gu | |
| 2017/0257441 A1 | 9/2017 | Ohara | |

FOREIGN PATENT DOCUMENTS

| | | | |
|---|---|---|---|
| JP | 2005-284947 A | 10/2005 | |
| JP | 2006-020262 A | 1/2006 | |

OTHER PUBLICATIONS

Mar. 22, 2018 Non-Final Rejection issued in U.S. Appl. No. 15/487,759.

* cited by examiner

*Primary Examiner* — Douglas Q Tran
(74) *Attorney, Agent, or Firm* — Oliff PLC (57) ABSTRACT

An information processing apparatus includes a processor that is programmed to acquire an organization information from another apparatus. In response to determining that: i) an organization information of the information processing apparatus and an organization information of the another apparatus do not match; and (ii) an authentication information set in the information processing apparatus remains to be a default setting, the processor is programmed to make no response to, or reject, an access request from the another apparatus.

2 Claims, 11 Drawing Sheets

INFORMATION PROCESSING APPARATUS, INFORMATION PROCESSING METHOD, AND NON-TRANSITORY COMPUTER READABLE STORAGE MEDIUM

CROSS-REFERENCE TO RELATED APPLICATIONS

This application is a continuation of U.S. application Ser. No. 15/487,759, filed Apr. 14, 2017, which claims the benefit of Japanese Application No. 2016-175187, filed Sep. 8, 2016. The entire prior applications are hereby incorporated by reference in their entireties.

BACKGROUND

Technical Field

The present invention relates to an information processing apparatus, an information processing method, and a non-transitory computer readable storage medium.

SUMMARY

According to an aspect of the invention, an information processing apparatus includes a receiving unit and a controller. The receiving unit receives an access request from another apparatus. If an IP address of the own apparatus is a global IP address, the controller makes no response to or reject the access request unless a predetermined condition indicating that the other apparatus belongs to an organization to which the own apparatus belongs is satisfied.

BRIEF DESCRIPTION OF THE DRAWINGS

Exemplary embodiments of the present invention will be described in detail based on the following figures, wherein.

DETAILED DESCRIPTION

Hereinafter, exemplary embodiments of the present invention will be described in detail with reference to the accompanying drawings.

[Hardware Configuration of Image Processing Apparatus]

Figure 1:
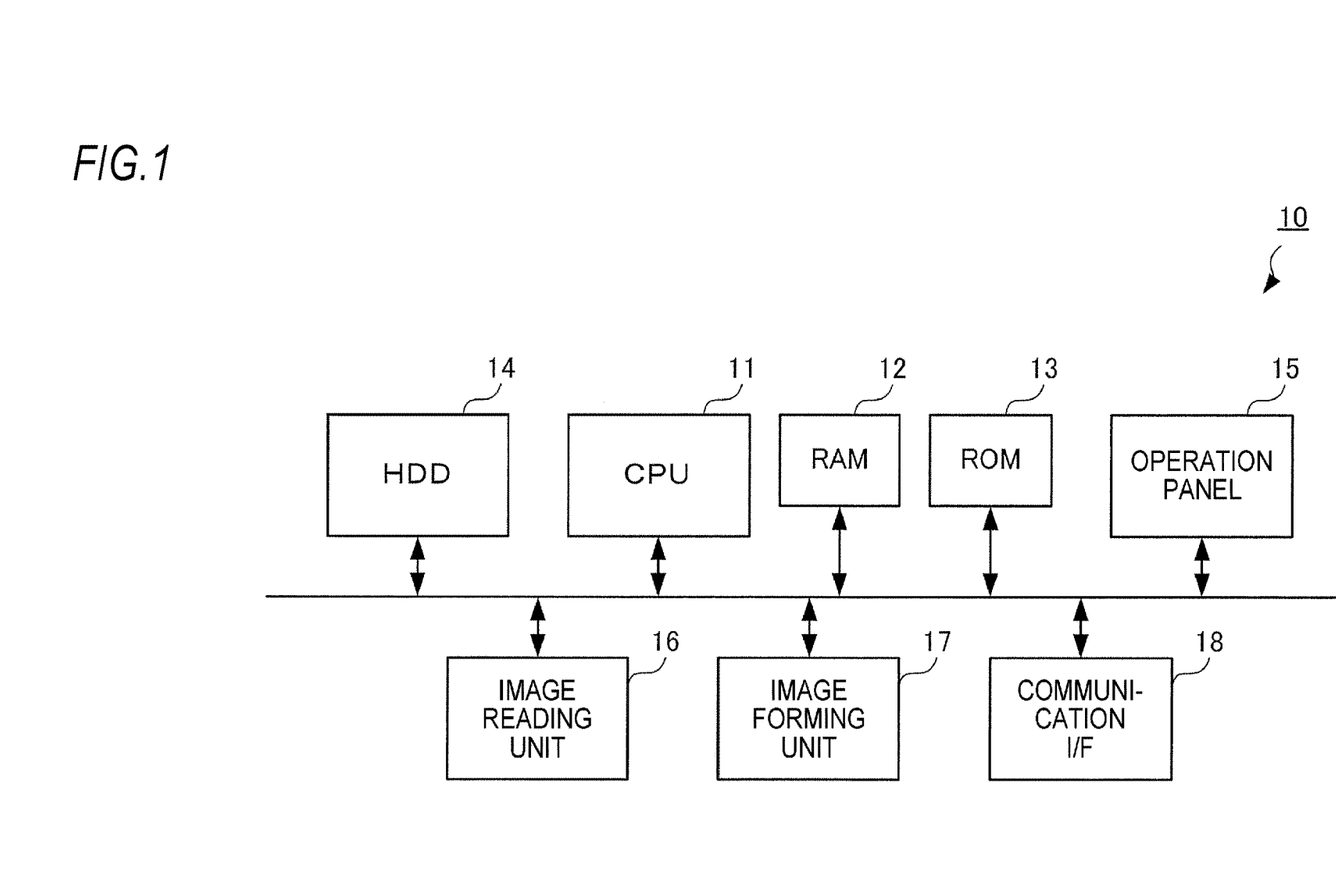
FIG. 1 is a view illustrating a hardware configuration example of an image processing apparatus to which an exemplary embodiment of the present invention is applied.

FIG. 1 is a view illustrating a hardware configuration example of an image processing apparatus 10 to which an exemplary embodiment is applied. As illustrated in the figure, the image processing apparatus 10 includes a central processing unit (CPU) 11, a random access memory (RAM) 12, a read only memory (ROM) 13, a hard disk drive (HDD) 14, an operation panel 15, an image reading unit 16, an image forming unit 17 and a communication interface (hereinafter referred to as a "communication I/F") 18.

The CPU 11 loads various programs stored in the ROM 13 into the RAM 12 and execute the programs to implement various functions to be described later.

The RAM 12 is a memory used as a working memory of the CPU 11.

The ROM 13 is a memory for storing various programs to be executed by the CPU 11.

The HDD 14 is, for example, a magnetic disk device that stores image data read by the image reading unit 16 and image data used for an image formation in the image forming unit 17.

The operation panel 15 is a touch panel for displaying various kinds of information and receiving operational inputs from a user. In this example, the operation panel 15 includes a display which is an example of a display screen on which various kinds of information are displayed, and a position detection sheet which detects a position indicated by an instruction unit such as a finger or a stylus pen.

The image reading unit 16 is an example of an image processing unit and reads an image recorded on a recording medium such as paper. In this example, the image reading unit 16 is a scanner, for example, which may employ a charge coupled device (CCD) system in which light which is emitted on an original document from a light source and is reflected by the original document is reduced by a lens and received by a CCD, or a contact image sensor (CIS) system in which light which is sequentially emitted onto an original document from an LED light source and reflected by the original document is received by a CIS.

The image forming unit 17 is an example of an image processing unit and forms an image on a recording medium. In this example, the image forming unit 17 is, for example, a printer which may employ an electrophotographic system in which a toner attached to a photoconductor is transferred onto a recording medium to form an image, or an inkjet method in which ink is ejected onto a recording medium to form an image.

The communication I/F 18 exchanges various kinds of information with another apparatus via a network.

First Exemplary Embodiment

Figure 2:
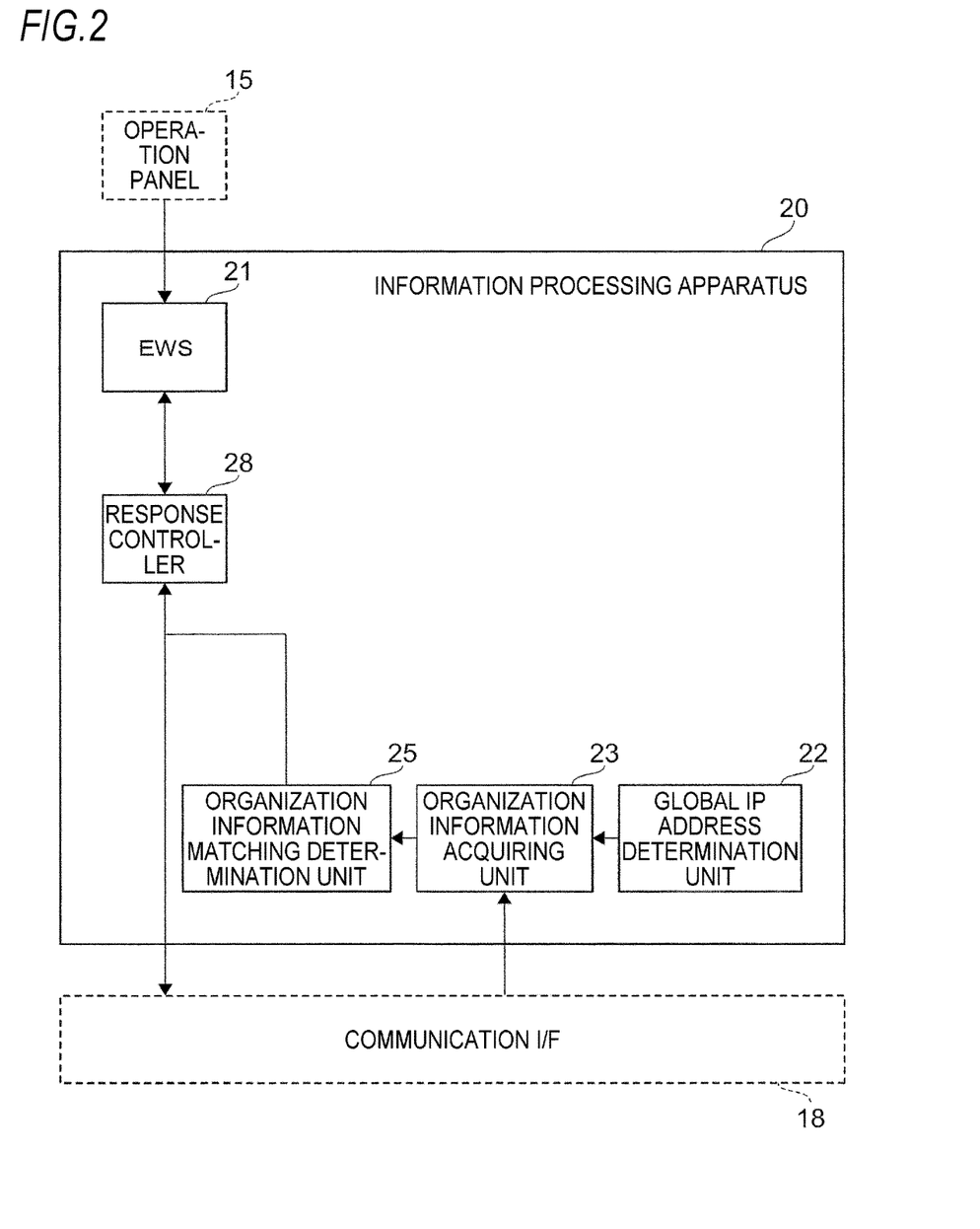
FIG. 2 is a block diagram illustrating a functional configuration example of an information processing apparatus according to a first exemplary embodiment of the present invention.

FIG. 2 is a block diagram illustrating a functional configuration example of an information processing apparatus 20 according to a first exemplary embodiment. Here, the information processing apparatus 20 may be regarded as an apparatus realized when the CPU 11 (see FIG. 1) of the image processing apparatus 10 reads programs for implementing respective functional units to be described later from, for example, the ROM 13 (see FIG. 1) and executes the programs in the RAM 12 (see FIG. 1). The operation panel 15 and the communication I/F 18 are also illustrated in the figure although they are not strictly constituent elements of the information processing apparatus 20.

As illustrated in the figure, the information processing apparatus 20 includes an embedded web server (EWS) 21, a global IP address determination unit 22, an organization information acquiring unit 23, an organization information matching determination unit 25 and a response controller 28.

The EWS 21 is a web server incorporated in the image processing apparatus 10. When a user uses a web browser of an external device (for example, a PC) on a network to access the image processing apparatus 10 and request services such as (i) confirmation of the status of the image processing apparatus 10, (ii) setting of the IP address and authentication information for the image processing apparatus 10, (iii) printing of a document in the image processing apparatus 10, or (iv) retrieval of a scanned document or fax reception document stored in a confidential box of the image processing apparatus 10, the EWS 21 provides the requested services to the external device.

The global IP address determination unit 22 determines whether or not the IP address of the image processing apparatus 10 is a global IP address. In this example, the IP address of the image processing apparatus 10 may be one assigned by a dynamic host configuration protocol (DHCP) server, or may be one statically set by the user from the operation panel 15. If it is determined that the IP address of the image processing apparatus 10 is the global IP address, the global IP address is transmitted to the organization information acquiring unit 23.

The organization information acquiring unit 23 receives a request from the external device on the network to the EWS 21. Then, the organization information acquiring unit 23 first uses a reverse domain name system (DNS) protocol to acquire a domain name of fully qualified domain name (FQDN) corresponding to the global IP address of the image processing apparatus 10 or the external device from a DNS server on the network. Next, the organization information acquiring unit 23 uses a WHOIS protocol to acquire organization information indicating an organization that owns the acquired domain name. Since one organization may have plural domains, in order to determine whether it is the same organization, not only the domain information indicating the domain but also the organization information is acquired. Hereinafter, the organization information acquired from the global IP address in this manner will be referred to as "organization information corresponding to the global IP address". Then, the organization information is transmitted to the organization information matching determination unit 25. In the exemplary embodiment, an external device is provided as an example of another apparatus, and the organization information acquiring unit 23 is provided as an example of a receiving unit that receives an access request from other apparatus.

Domain information referred to by the WHOIS protocol will now be described. The domain information associates organization information including items such as "Organization", and "Organization type" with a "domain name". For example, if the "domain name" is "FUJIXEROX.CO.JP", "Organization" is "Fuji Xerox Co., Ltd." which is the English notation of the organization having the domain name. In addition, "Organization Type" is "Corporation" which is English notation of the type of the organization having the domain name.

The organization information matching determination unit 25 determines whether or not the organization information corresponding to the global IP address of the image processing apparatus 10 matches the organization information corresponding to the global IP address of the external device, and outputs a result of the determination to the response controller 28. In the exemplary embodiment, the condition that the organization information corresponding to the global IP address of the image processing apparatus 10 matches the organization information corresponding to the global IP address of the external device is employed as an example of a condition that an organization which owns a global IP address of an own apparatus owns a global IP address of another apparatus.

Upon receiving a result of the determination indicating that the organization information corresponding to the global IP address of the image processing apparatus 10 does not match the organization information corresponding to the global IP address of the external device, the response controller 28 makes no response to or rejects a request from the external device. Upon receiving a result of the determination indicating that the organization information corresponding to the global IP address of the image processing apparatus 10 matches the organization information corresponding to the global IP address of the external device, the response controller 28 makes a response to the request from the external device. In the exemplary embodiment, mismatch between the organization information corresponding to the global IP address of the image processing apparatus 10 and the organization information corresponding to the global IP address of the external device is employed as an example of dissatisfaction of a predetermined condition indicating that another apparatus belongs to an organization to which an own apparatus belongs. The response controller 28 is provided as an example of a controller that makes no response to or rejects an access request unless the predetermined condition are satisfied.

Figure 3:
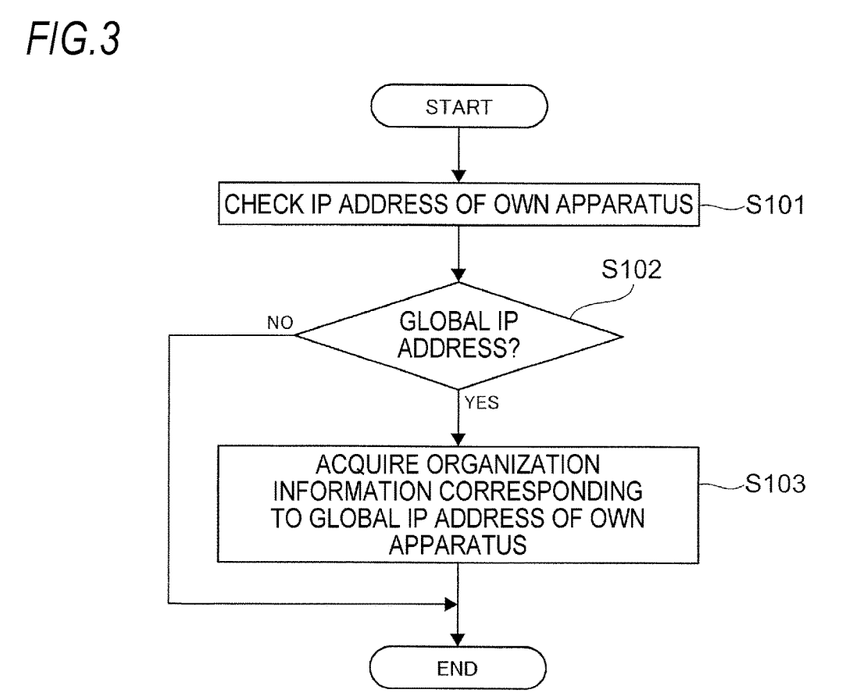
FIG. 3 is a flowchart illustrating an operation example when the information processing apparatus according to the first exemplary embodiment of the present invention is activated.

FIG. 3 is a flowchart illustrating an example of the initial operation when the image processing apparatus 10 is powered on and activated.

As illustrated, in the information processing apparatus 20, first, the global IP address determination unit 22 checks the IP address of the own apparatus, that is, the IP address of the image processing apparatus 10 (step 101). Then, it is determined whether or not the IP address is a global IP address (step 102).

As a result of the determination, when it is determined that the IP address of the own apparatus is the global IP address, the organization information acquiring unit 23 acquires the organization information corresponding to the global IP address of the own apparatus (step 103). Specifically, the organization information acquiring unit 23 acquires a domain name from the IP address with a reverse DNS protocol and acquires organization information from the domain name with a WHOIS protocol.

Meanwhile, when it is determined that the IP address of the own apparatus is not the global IP address, the information processing apparatus 20 ends the process as it is.

The operation of FIG. 3 is executed when the image processing apparatus 10 is activated. It should be noted that exemplary embodiments are not limited thereto. For example, when a lease period of the IP address allocated from a DHCP server expires and a new IP address is allocated or when the user sets a new IP address, the operation of FIG. 3 may be executed again.

Figure 4:
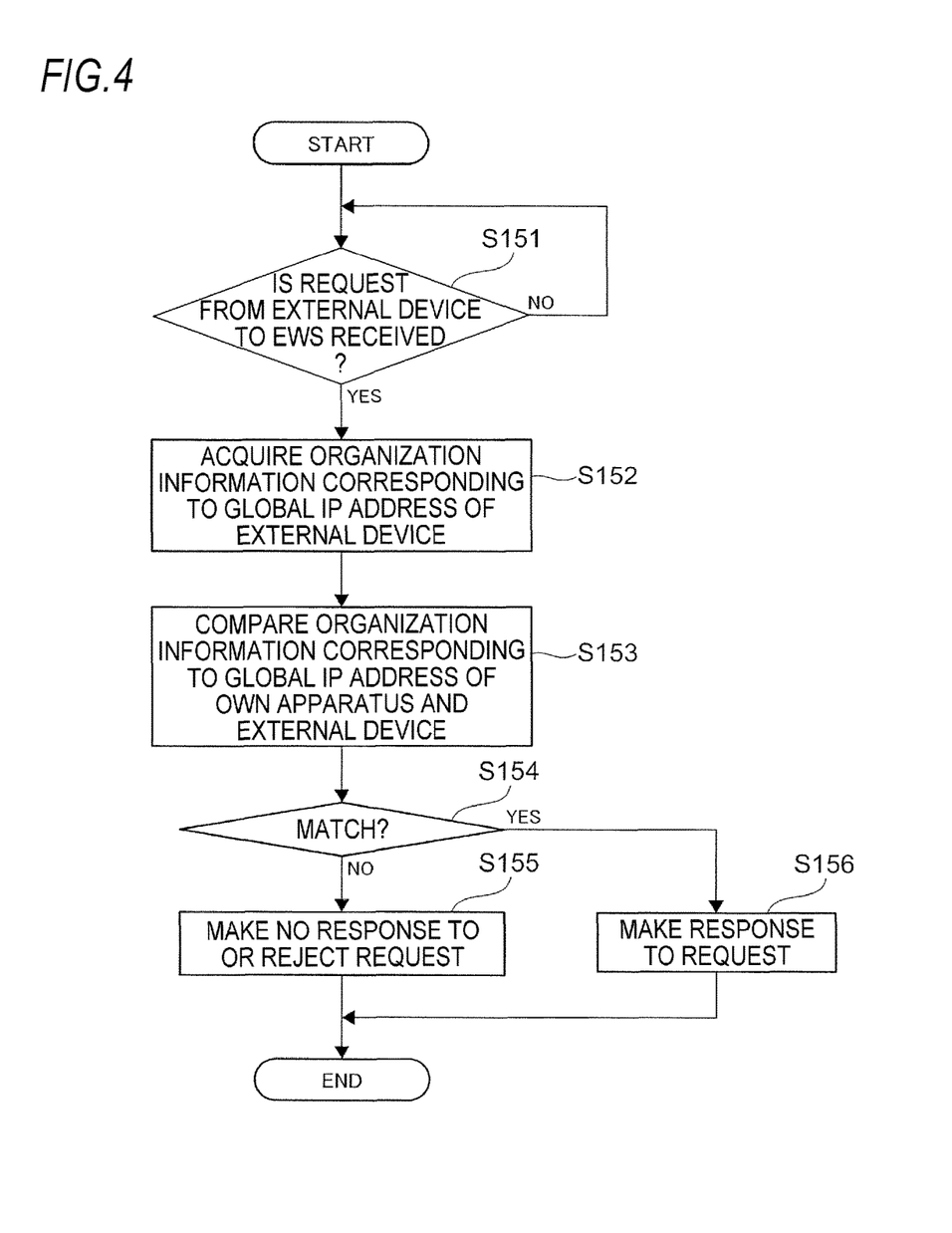
FIG. 4 is a flowchart illustrating an operation example when a request is sent from an external device to the information processing apparatus according to the first exemplary embodiment of the present invention.

FIG. 4 is a flowchart illustrating an operation example when a request is sent from an external device to the EWS 21 of the image processing apparatus 10.

As illustrated, in the information processing apparatus 20, first, the organization information acquiring unit 23 waits until receiving an information acquisition request or an information setting request from the external device on the network to the EWS 21 (step 151). Then, upon receiving the request, the organization information acquiring unit 23 acquires the organization information corresponding to the IP address (global IP address) of the external device (step 152). Specifically, the organization information acquiring unit 23 acquires a domain name from the IP address with a reverse DNS protocol and acquires organization information from the domain name with a WHOIS protocol. At this time, by caching the correspondence between the acquired global IP address of the external device and the acquired organization information, it may not be necessary to acquire the organization information by making an inquiry every time a request comes from the external device.

Next, the organization information matching determination unit 25 compares the organization information corresponding to the global IP address of the image processing apparatus 10 with the organization information corresponding to the global IP address of the external device (step 153) to determine whether or not both match with each other (step 154).

When it is determined that both do not match with each other, the response controller 28 determines that the image processing apparatus 10 is receiving a request from an external device belonging to another organization, and makes no response to or rejects the request (step 155). In the case of rejection, for example, it is sufficient to respond with an HTTP status code 403 (Access Denied).

Meanwhile, when it is determined that both match with each other, the response controller 28 determines that the image processing apparatus 10 is receiving a request from the external device belonging to the same organization, and makes a response to the request (step 156). For example, if the request is a request to acquire state information of the image processing apparatus 10, the response controller 28 responds with the state information in association with the EWS 21. Alternatively, if the request is a request to acquire document data in the confidential box of the image processing apparatus 10, the response controller 28 responds with the document data in the confidential box in association with the EWS 21. At this time, if an authentication mode of the image processing apparatus 10 is ON, that is, if authentication is requested for an access from the outside, the authentication may be performed before the response, and the response may be made only when the authentication is successful.

Second Exemplary Embodiment

Figure 5:
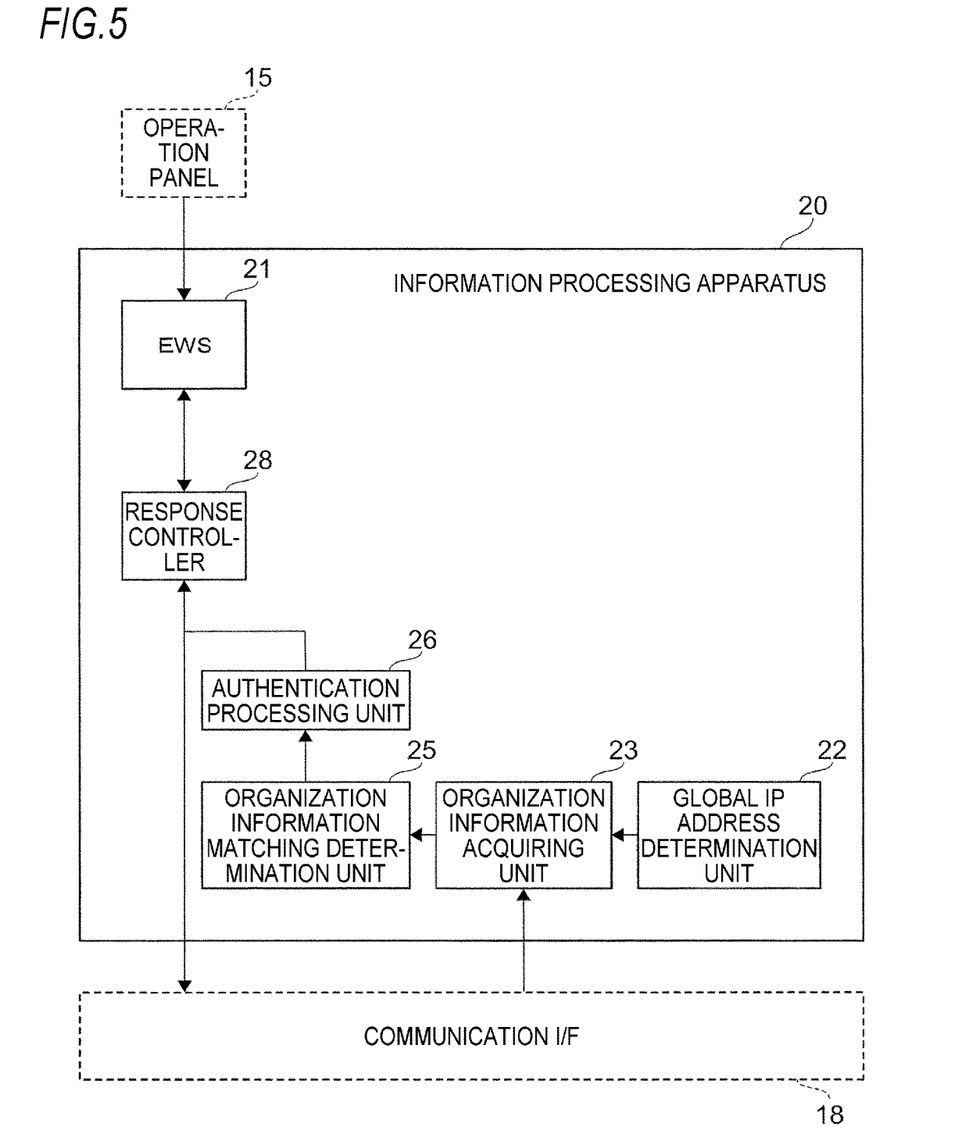
FIG. 5 is a block diagram illustrating a functional configuration example of an information processing apparatus according to a second exemplary embodiment of the present invention.

FIG. 5 is a block diagram illustrating a functional configuration example of the information processing apparatus 20 according to a second exemplary embodiment. Here, the information processing apparatus 20 may be regarded as an apparatus realized when the CPU 11 (see FIG. 1) of the image processing apparatus 10 reads programs for implementing respective functional units to be described later from, for example, the ROM 13 (see FIG. 1) and executes the programs in the RAM 12 (see FIG. 1). The operation panel 15 and the communication I/F 18 are also illustrated in the figure although they are not strictly constituent elements of the information processing apparatus 20.

As illustrated in the figure, the information processing apparatus 20 includes an EWS 21, a global IP address determination unit 22, an organization information acquiring unit 23, an organization information matching determination unit 25, an authentication processing unit 26 and a response controller 28.

Among them, since the EWS 21, the global IP address determination unit 22 and the organization information acquiring unit 23 are the same as those described in the first exemplary embodiment, description thereon will be omitted. The organization information matching determination unit 25, the authentication processing unit 26 and the response controller 28 will only be described.

The organization information matching determination unit 25 determines whether or not the organization information corresponding to the global IP address of the image processing apparatus 10 matches the organization information corresponding to the global IP address of the external device, and outputs a result of the determination to the authentication processing unit 26. In the exemplary embodiment, the condition that the organization information corresponding to the global IP address of the image processing apparatus 10 matches the organization information corresponding to the global IP address of the external device is employed as an example of a condition that an organization which owns a global IP address of an own apparatus owns a global IP address of another apparatus.

The authentication processing unit 26 determines whether or not the authentication mode of the image processing apparatus 10 is "ON." In addition, if a result of the determination indicating that the organization information corresponding to the global IP address of the image processing apparatus 10 does not match the organization information corresponding to the global IP address of the external device is transmitted and if the authentication mode is "ON," it is determined whether or not the authentication information set in the image processing apparatus 10 remains with a default setting. The authentication information used herein is authentication information for accessing the EWS 21 and includes a user ID and a password. Then, the phrase "remaining with a default setting" means that both the user ID and the password remain with a default value. When either of the user ID or the password is changed, it is assumed to be "changed from the default setting". Further, if a result of the determination indicating that the organization information corresponding to the global IP address of the image processing apparatus 10 matches the organization information corresponding to the global IP address of the external device is transmitted and if the authentication mode is "ON," the authentication is performed. The authentication used herein refers to a process of determining whether or not authentication information set in a request from the external device matches the authentication information set in the image processing apparatus 10. Then, the response controller 28 is notified of a result of the determination as to whether or not the organization information corresponding to the global IP address of the image processing apparatus 10 matches the organization information corresponding to the global IP address of the external device, whether the authentication mode is "ON" or "OFF," whether or not the authentication information set in the image processing apparatus 10 remains with the default setting or is changed, and whether the authentication is successful or unsuccessful.

Upon receiving (i) the result of the determination indicating that the organization information corresponding to the global IP address of the image processing apparatus 10 does not match the organization information corresponding to the global IP address of the external device and that the authentication mode is "OFF" or (ii) the result of the determination indicating that the organization information corresponding to the global IP address of the image processing apparatus 10 does not match the organization information corresponding to the global IP address of the external device, that the authentication mode is "ON," and that the authentication information set in the image processing apparatus 10 remains with the default setting, the response controller 28 makes no response to or rejects a request from the external device. Further, upon receiving (i) the result of the determination indicating that the organization information corresponding to the global IP address of the image processing apparatus 10 matches the organization information corresponding to the global IP address of the external device and that the authentication mode is "OFF" or (ii) the result of the determination indicating that the organization information corresponding to the global IP address of the image processing apparatus 10 matches the organization information corresponding to the global IP address of the external device, that the authentication mode is "ON," and that the authentication is successful, the response controller 28 makes a response to the request from the external device. In the exemplary embodiment, mismatch between the organization information corresponding to the global IP address of the image processing apparatus 10 and the organization information corresponding to the global IP address of the external device is employed as an example of dissatisfaction of a predetermined condition indicating that another apparatus belongs to an organization to which an own apparatus belongs. The response controller 28 is provided as an example of a controller that makes no response to or rejects an access request unless the predetermined condition are satisfied.

Since the initial operation when the image processing apparatus 10 is powered on and activated is the same as that described in the first exemplary embodiment, description thereon will be omitted.

Figure 6:
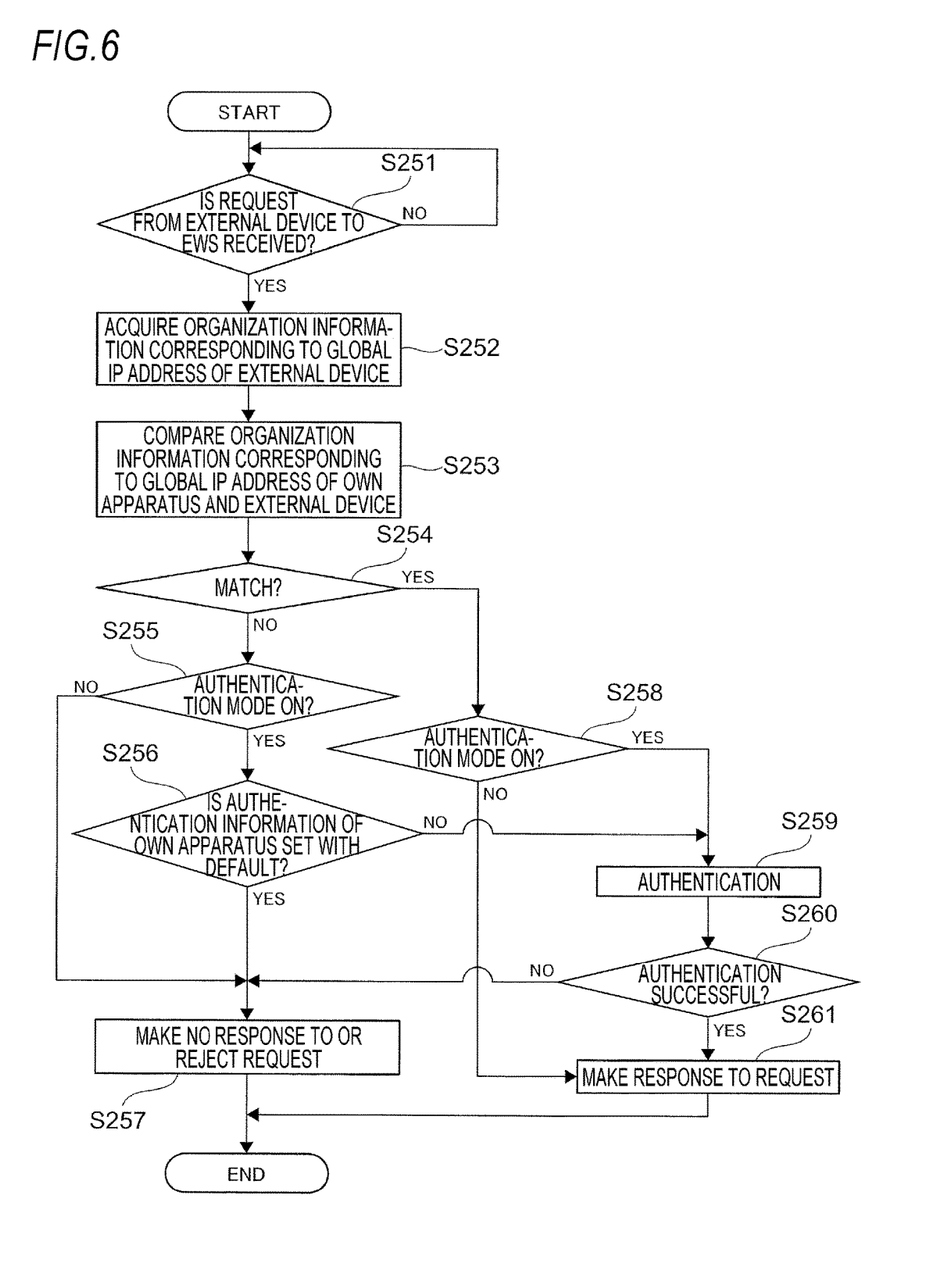
FIG. 6 is a flowchart illustrating an operation example when a request is sent from an external device to the information processing apparatus according to the second exemplary embodiment of the present invention.

FIG. 6 is a flowchart illustrating an operation example when a request is sent from the external device to the EWS 21 of the image processing apparatus 10.

As illustrated, in the information processing apparatus 20, first, the organization information acquiring unit 23 waits until receiving an information acquisition request or an information setting request from the external device on the network to the EWS 21 (step 251). Then, upon receiving the request, the organization information acquiring unit 23 acquires the organization information corresponding to the IP address (global IP address) of the external device (step 252). Specifically, the organization information acquiring unit 23 acquires a domain name from the IP address with a reverse DNS protocol and acquires organization information from the domain name with a WHOIS protocol. At this time, by caching the correspondence between the acquired global IP address of the external device and the acquired organization information, it may not be necessary to acquire the organization information by making an inquiry every time a request comes from the external device.

Next, the organization information matching determination unit 25 compares the organization information corresponding to the global IP address of the image processing apparatus 10 with the organization information corresponding to the global IP address of the external device (step 253) to determine whether or not both match with each other (step 254).

When it is determined that both do not match with each other, the authentication processing unit 26 determines that the image processing apparatus 10 is receiving a request from an external device belonging to another organization, and determines whether or not the authentication mode of the image processing apparatus 10 is "ON" (step 255). When it is determined that the authentication mode is "ON," the authentication processing unit 26 determines whether or not the authentication information set in the image processing apparatus 10 remains with a default setting (step 256). When it is determined that the authentication information remains with the default setting, the response controller 28 makes no response to or rejects the request (step 257). In the case of rejection, for example, it is sufficient to respond with an HTTP status code 403 (Access Denied).

When it is determined in the step 255 that the authentication mode is "OFF," the response controller 28 makes no response to or rejects the request from the external device (step 257). In the case of rejection, for example, it is sufficient to respond with an HTTP status code 403 (Access Denied).

When it is determined in the step 256 that the authentication information is changed from the default setting, the authentication processing unit 26 performs authentication (step 259) and determines whether or not the authentication is successful (step 260). When it is determined that the authentication is successful, the response controller 28 makes a response to the request from the external device (step 261). When it is determined that the authentication is unsuccessful, the response controller 28 rejects the request from the external device (step 257). In this case, for example, it is sufficient to respond with an HTTP status code 401 (Unauthorized).

Meanwhile, when it is determined in the step 254 that both match with each other, the authentication processing unit 26 determines whether or not the authentication mode of the image processing apparatus 10 is "ON" (step 258). When it is determined that the authentication mode is "OFF," the response controller 28 determines that the image processing apparatus 10 is receiving a request from the external device belonging to the same organization, and makes a response to the request (step 261). When it is determined that the authentication mode is "ON," the authentication processing unit 26 performs authentication (step 259) and determines whether the authentication is successful or unsuccessful (step 260). When it is determined that the authentication is successful, the response controller 28 makes a response to the request from the external device (step 261). When it is determined that the authentication is unsuccessful, the response controller 28 rejects the request from the external device (step 257). In this case, for example, it is sufficient to respond with an HTTP status code 401 (Unauthorized).

Third Exemplary Embodiment

Figure 7:
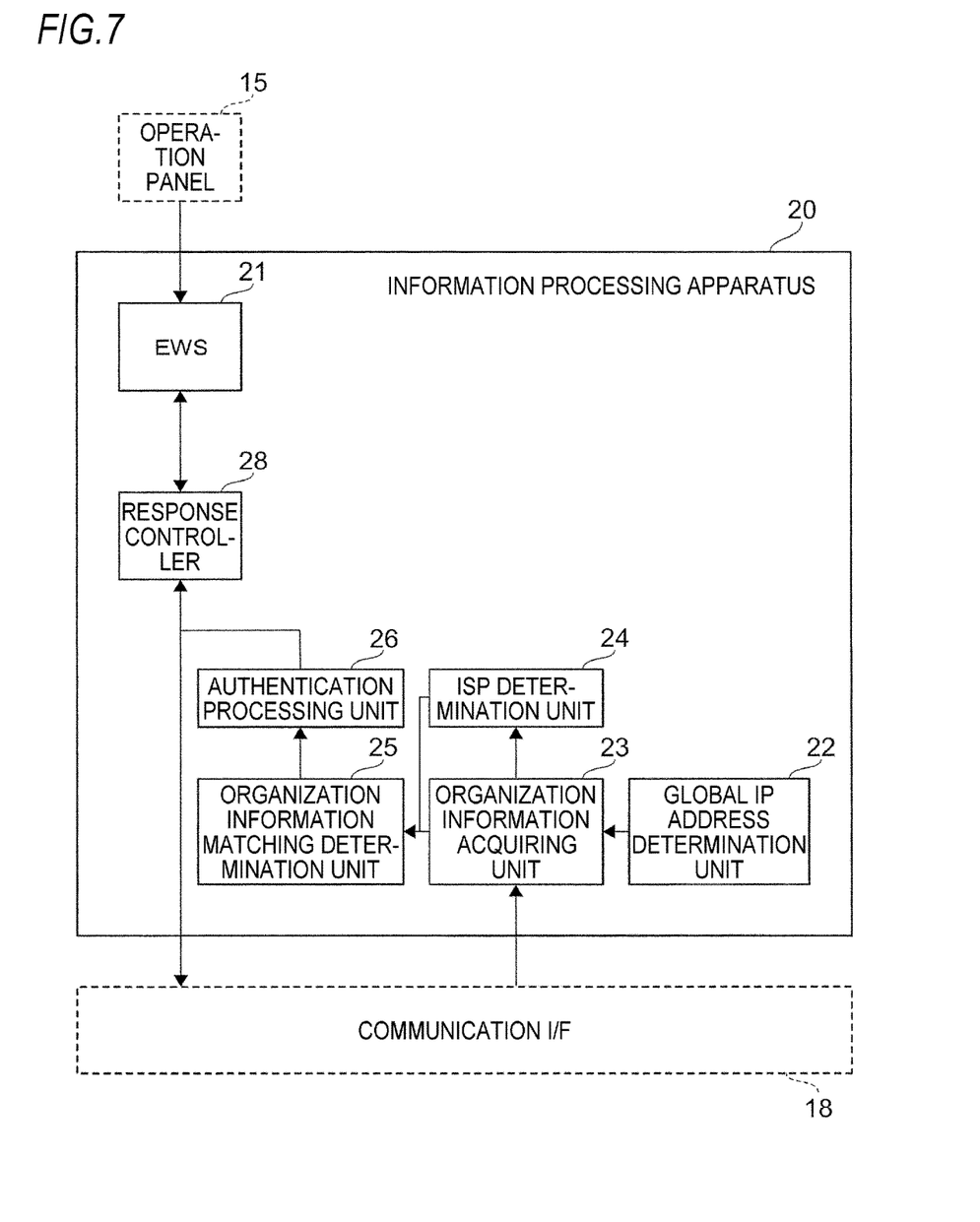
FIG. 7 is a block diagram illustrating a functional configuration example of an information processing apparatus according to a third exemplary embodiment of the present invention.

FIG. 7 is a block diagram illustrating a functional configuration example of the information processing apparatus 20 according to a third exemplary embodiment. Here, the information processing apparatus 20 may be regarded as an apparatus realized when the CPU 11 (see FIG. 1) of the image processing apparatus 10 reads programs for implementing respective functional units to be described later from, for example, the ROM 13 (see FIG. 1) and executes the programs in the RAM 12 (see FIG. 1). The operation panel 15 and the communication I/F 18 are also illustrated in the figure although they are not strictly constituent elements of the information processing apparatus 20.

As illustrated in the figure, the information processing apparatus 20 includes an EWS 21, a global IP address determination unit 22, an organization information acquiring unit 23, and ISP determination unit 24, an organization information matching determination unit 25, an authentication processing unit 26 and a response controller 28.

Among them, the EWS 21 and the global IP address determination unit 22 are the same as those described in the first exemplary embodiment. The authentication processing unit 26 and the response controller 28 are the same as those described in the second exemplary embodiment except that "the organization information corresponding to the global IP address of the image processing apparatus 10 and the organization information corresponding to the global IP address of the external device match with each other and an ISP access flag is ON" is added to "the organization information corresponding to the global IP address of the image processing apparatus 10 and the organization information corresponding to the global IP address of the external device do not match with each other," and "the organization information corresponding to the global IP address of the image processing apparatus 10 and the organization information corresponding to the global IP address of the external device match with each other and the ISP access flag is OFF" is excluded from "the organization information corresponding to the global IP address of the image processing apparatus 10 and the organization information corresponding to the global IP address of the external device match with each other". Therefore, description thereon will be omitted. The organization information acquiring unit 23, the ISP determination unit 24 and the organization information matching determination unit 25 will only be described.

The organization information acquiring unit 23 receives a request from the external device on the network to the EWS 21. Then, the organization information acquiring unit 23 first uses a reverse domain name system (DNS) protocol to acquire a domain name of fully qualified domain name (FQDN) corresponding to the global IP address of the image processing apparatus 10 or the external device from a DNS server on the network. Next, the organization information acquiring unit 23 uses a WHOIS protocol to acquire organization information indicating an organization that owns the acquired domain name. Since one organization may have plural domains, in order to determine whether it is the same organization, not only the domain information indicating the domain but also the organization information is acquired. In this manner, the organization information acquiring unit 23 acquires the organization information corresponding to the global IP address. Then, the organization information is transmitted to the ISP determination unit 24 and the organization information matching determination unit 25. In the exemplary embodiment, an external device is provided as an example of another apparatus, and the organization information acquiring unit 23 is provided as an example of a receiving unit that receives an access request from other apparatus.

The ISP determination unit 24 determines whether or not the organization information corresponding to the global IP address of the image processing apparatus 10 indicates an Internet service provider (ISP). In the case of ISP, since the "organization type" of the organization information is "network service", it is possible to determine whether or not the organization information indicates ISP by referring to the "organization type". Alternatively, a domain name or an organization name of the ISP may be registered in the image processing apparatus 10 in advance and determination may be made from the domain name or the organization name transmitted from the organization information acquiring unit 23. When the organization information corresponding to the global IP address of the image processing apparatus 10 indicates the ISP, the image processing apparatus 10 is considered to obtain the global IP address from the ISP. Therefore, even when the organization information corresponding to the global IP address of the image processing apparatus 10 matches the organization information corresponding to the global IP address of the external device, the image processing apparatus 10 and the external device do not necessarily belong to the same organization. Therefore, in this case, the ISP access flag is "ON." When the organization information corresponding to the global IP address of the image processing apparatus 10 does not indicate the ISP, the ISP access flag is "OFF."

The organization information matching determination unit 25 determines whether or not the organization information corresponding to the global IP address of the image processing apparatus 10 matches the organization information corresponding to the global IP address of the external device. Further, it determines whether the ISP access flag held by the ISP determination unit 24 is "ON" or "OFF." Then, this determination result is transmitted to the authentication processing unit 26. In the exemplary embodiment, the condition that the organization information corresponding to the global IP address of the image processing apparatus 10 matches the organization information corresponding to the global IP address of the external device and the ISP access flag held by the ISP determination unit 24 is "OFF" is employed as an example of a condition that an organization which owns a global IP address of an own apparatus owns a global IP address of another apparatus and that the organization which owns the global IP address of the other apparatus is not an ISP.

Figure 8:
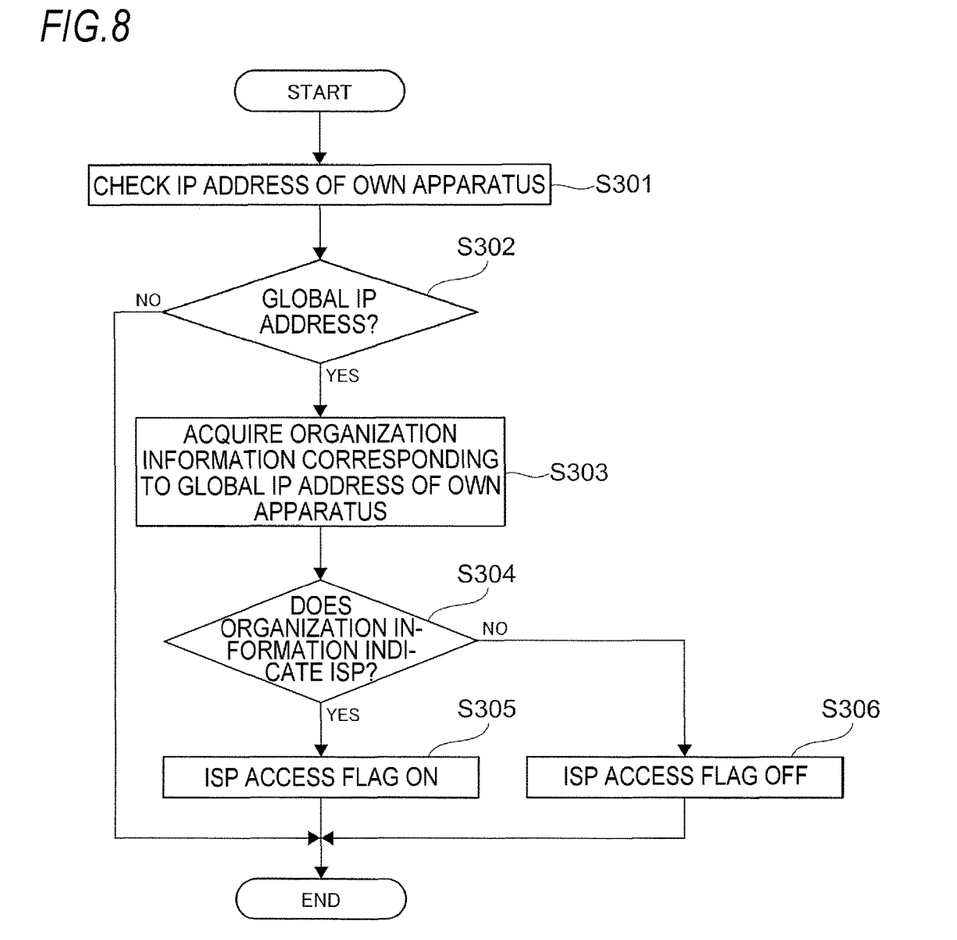
FIG. 8 is a flowchart illustrating an operation example when the information processing apparatus according to the third exemplary embodiment of the present invention is activated.

FIG. 8 is a flowchart illustrating an example of the initial operation when the image processing apparatus 10 is powered on and activated.

As illustrated in the figure, in the information processing apparatus 20, the global IP address determination unit 22 first checks the IP address of the own apparatus, that is, the IP address of the image processing apparatus 10 (step 301). Then, it is determined whether or not the IP address is a global IP address (step 302).

When it is determined that the IP address of the own apparatus is the global IP address, the organization information acquiring unit 23 acquires the organization information corresponding to the global IP address of the own apparatus (step 303). Specifically, the organization information acquiring unit 23 acquires a domain name from the IP address with a reverse DNS protocol and acquires organization information from the domain name with a WHOIS protocol.

Next, the ISP determination unit 24 determines whether or not the organization information acquired in step 303 indicates ISP (step 304). When it is determined that the organization information indicates the ISP, the ISP determination unit 24 sets the ISP access flag to "ON" (step 305). When it is determined that the organization information does not indicate the ISP, the ISP determination unit 24 sets the ISP access flag to "OFF" (step 306).

Meanwhile, when it is determined in step 302 that the IP address of the own apparatus is not the global IP address, the information processing apparatus 20 ends the process as it is.

Figure 9:
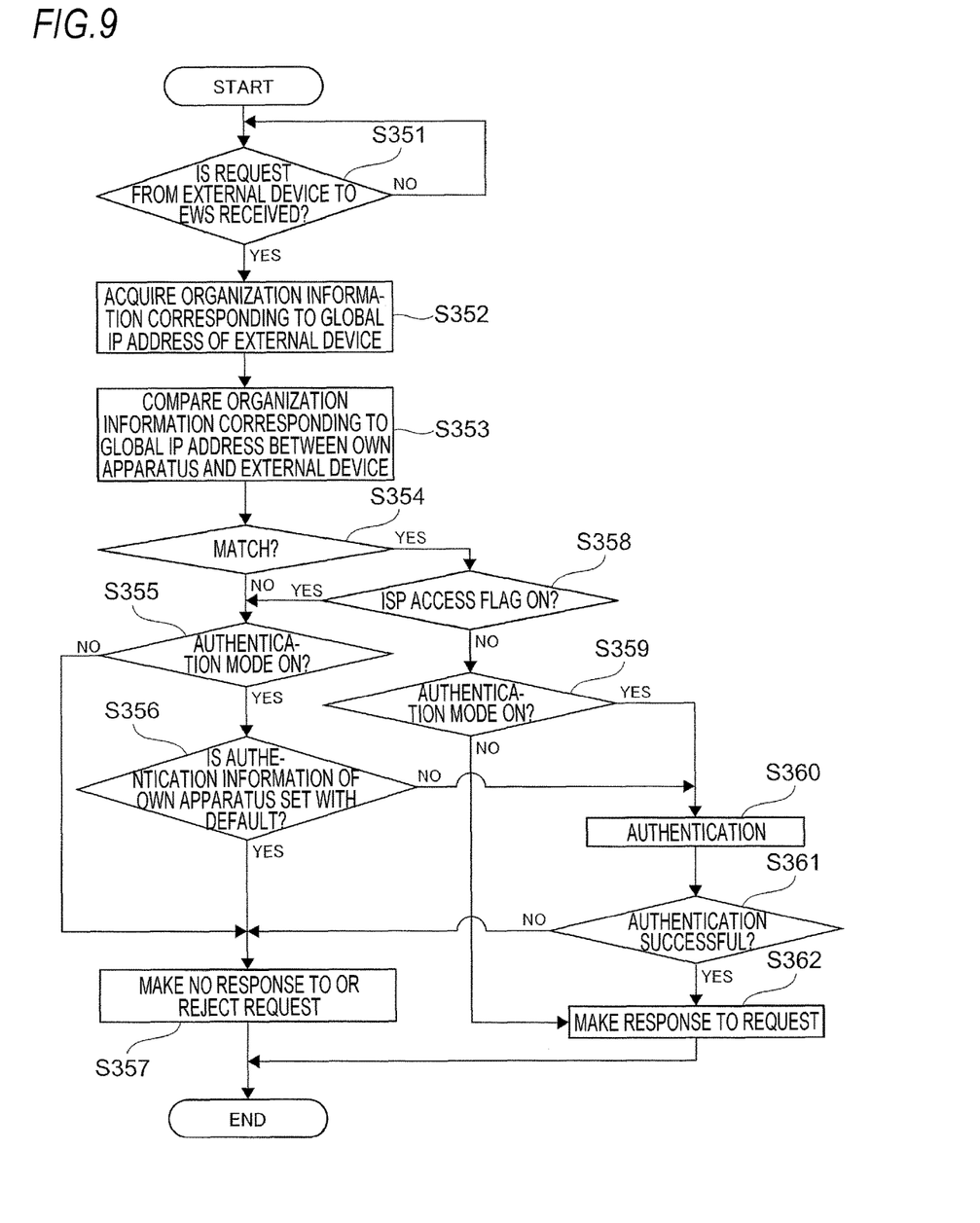
FIG. 9 is a flowchart illustrating an operation example when a request is sent from an external device to the information processing apparatus according to the third exemplary embodiment of the present invention.

FIG. 9 is a flowchart illustrating an operation example when a request is sent from the external device to the EWS 21 of the image processing apparatus 10.

As illustrated, in the information processing apparatus 20, first, the organization information acquiring unit 23 waits until receiving an information acquisition request or an information setting request from the external device on the network to the EWS 21 (step 351). Then, upon receiving the request, the organization information acquiring unit 23 acquires the organization information corresponding to the IP address (global IP address) of the external device (step 352). Specifically, the organization information acquiring unit 23 acquires a domain name from the IP address with a reverse DNS protocol and acquires organization information from the domain name with a WHOIS protocol. At this time, by caching the correspondence between the acquired global IP address of the external device and the acquired organization information, it may not be necessary to acquire the organization information by making an inquiry every time a request comes from the external device.

Next, the organization information matching determination unit 25 compares the organization information corresponding to the global IP address of the image processing apparatus 10 with the organization information corresponding to the global IP address of the external device (step 353) to determine whether or not both match with each other (step 354).

When it is determined that both do not match with each other, the authentication processing unit 26 determines that the image processing apparatus 10 is receiving a request from an external device belonging to another organization, and determines whether or not the authentication mode of the image processing apparatus 10 is "ON" (step 355). When it is determined that the authentication mode is "ON," it is subsequently determined whether or not the authentication information set in the image processing apparatus 10 remains with a default setting (step 356). When it is determined that the authentication information remains with the default setting, the response controller 28 makes no response to the request or rejects the request (step 357). In the case of rejection, for example, it is sufficient to respond with an HTTP status code 403 (Access Denied).

If it is determined in the step 355 that the authentication mode is "OFF," the response controller 28 makes no response to or rejects the request from the external device (step 357). In the case of rejection, for example, it is sufficient to respond with an HTTP status code 403 (Access Denied).

If it is determined in the step 356 that the authentication information is changed from the default setting, the authentication processing unit 26 performs authentication (step 360) and determines whether the authentication is successful or unsuccessful (step 361). When it is determined that the authentication is successful, the response controller 28 makes a response to the request from the external device (step 362). When it is determined that the authentication is unsuccessful, the response controller 28 rejects the request from the external device (step 357). In this case, for example, it is sufficient to respond with an HTTP status code 401 (Unauthorized).

Meanwhile, if it is determined in the step 354 that both match with each other, the organization information matching determination unit 25 inquires of the ISP determination unit 24 to determine whether or not the ISP access flag set in the process of FIG. 8 is "ON" (step 358).

When it is determined that the ISP access flag is "ON," even when the organization information corresponding to the global IP address of the image processing apparatus 10 matches the organization information corresponding to the global IP address of the external device, since there is a possibility that the image processing apparatus 10 and the external device belong to another organization, the process is executed from the step 355.

When it is determined that the ISP access flag is "OFF," the authentication processing unit 26 determines whether or not the authentication mode of the image processing apparatus is "ON" (step 359). When it is determined that the authentication mode is "OFF," the response controller 28 determines that the image processing apparatus 10 is receiving a request from an external device belonging to the same organization, and makes a response to the request (step 362). When it is determined that the authentication mode is "ON," authentication is performed (step 360), and it is determined whether the authentication is successful or unsuccessful (step 361). When it is determined that the authentication is successful, the response controller 28 makes a response to the request from the external device (step 362). When it is determined that the authentication is unsuccessful, the response controller 28 rejects the request from the external device (step 357). In this case, for example, it is sufficient to respond with an HTTP status code 401 (Unauthorized).

Fourth Exemplary Embodiment

Figure 10:
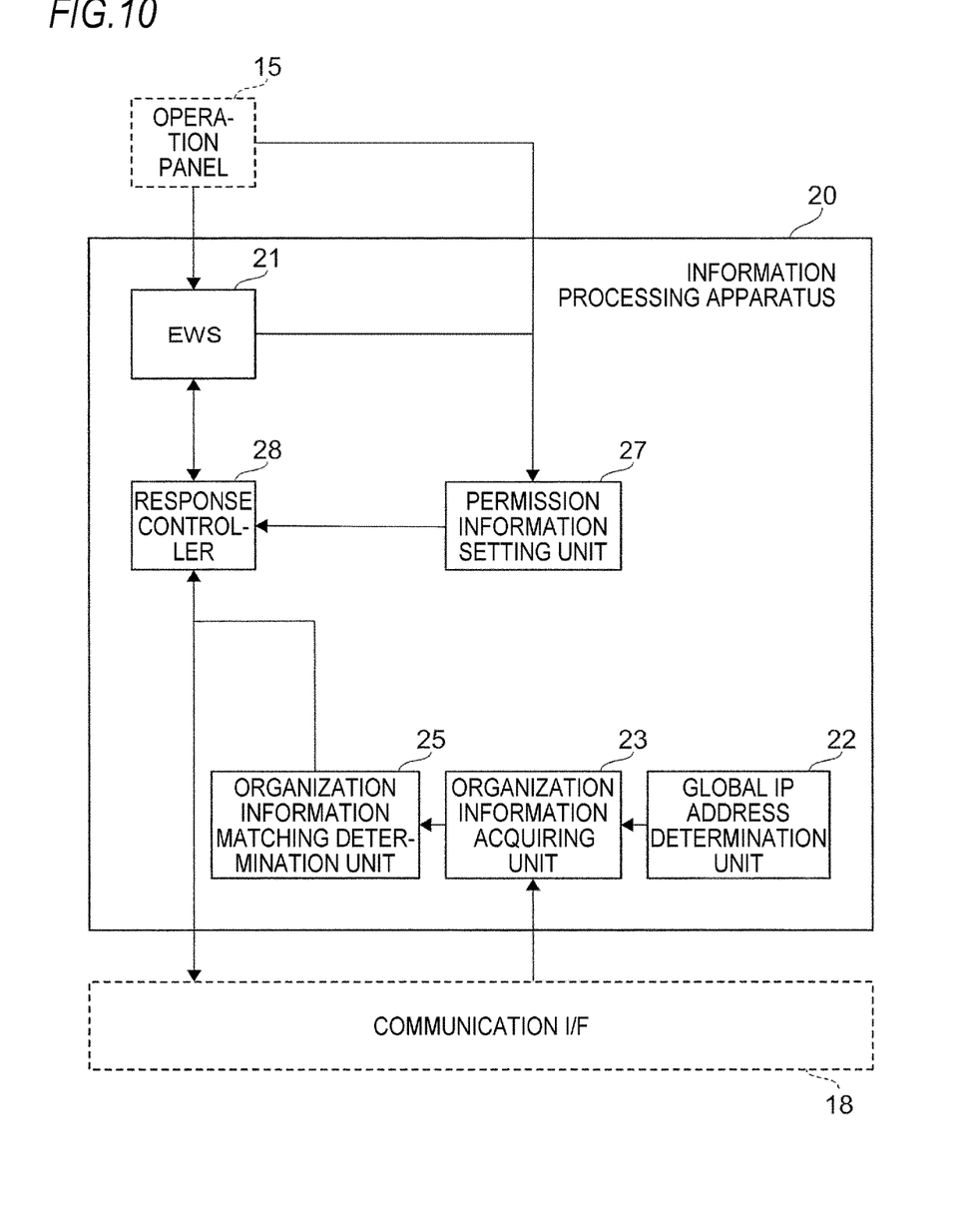
FIG. 10 is a block diagram illustrating a functional configuration example of an information processing apparatus according to a fourth exemplary embodiment of the present invention.

FIG. 10 is a block diagram illustrating a functional configuration example of an information processing apparatus 20 according to a fourth exemplary embodiment. Here, the information processing apparatus 20 may be regarded as an apparatus realized when the CPU 11 (see FIG. 1) of the image processing apparatus 10 reads programs for implementing respective functional units to be described later from, for example, the ROM 13 (see FIG. 1) and executes the programs in the RAM 12 (see FIG. 1). The operation panel 15 and the communication I/F 18 are also illustrated in the figure although they are not strictly constituent elements of the information processing apparatus 20.

As illustrated in the figure, the information processing apparatus 20 includes an EWS 21, a global IP address determination unit 22, an organization information acquiring unit 23, an organization information matching determination unit 25, a permission information setting unit 27 and a response controller 28.

Among them, since the EWS 21, the global IP address determination unit 22, the organization information acquiring unit 23 and the organization information matching determination unit 25 are the same as those described in the first exemplary embodiment. Description thereon will be omitted. The permission information setting unit 27 and the response controller 28 will only be described.

In accordance with a setting request from the operation panel 15 or the EWS 21, the permission information setting unit 27 sets permission information including (i) a global IP address of an external device that is permitted to make an access to the EWS 21 among external devices belonging to an organization different from the image processing apparatus 10 or (ii) domain information corresponding to the global IP address. In the following description, the permission information is described as including the global IP address of the external device or the domain information corresponding to the global IP address. It should be noted that the permission information is only required to include at least a part of the global IP address of the external device or information of an organization owning this global IP address.

Upon receiving a result of determination indicating that the organization information corresponding to the global IP address of the image processing apparatus 10 and the organization information corresponding to the global IP address of the external device do not match with each other, the response controller 28 refers to the permission information set by the permission information setting unit 27 to determine whether or not the global IP address of the external device or the corresponding domain information is included in the permission information. When it is determined that the global IP address of the external device or the corresponding domain information is included in the permission information, the response controller 28 makes a response to a request from the external device. When it is determined that the global IP address of the external device and the corresponding domain information are not included in the permission information, the response controller 28 makes no response to or rejects the request from the external device. Upon receiving a result of the determination indicating that the organization information corresponding to the global IP address of the image processing apparatus 10 matches the organization information corresponding to the global IP address of the external device, the response controller 28 makes a response to the request from the external device. In the exemplary embodiment, mismatch between the organization information corresponding to the global IP address of the image processing apparatus 10 and the organization information corresponding to the global IP address of the external device is employed as an example of dissatisfaction of a predetermined condition indicating that another apparatus belongs to an organization to which an own apparatus belongs. The response controller 28 is provided as an example of a controller that makes no response to or rejects an access request unless the predetermined condition are satisfied.

Since the initial operation when the image processing apparatus 10 is powered on and activated is the same as that described in the first exemplary embodiment, description thereon will be omitted.

Figure 11:
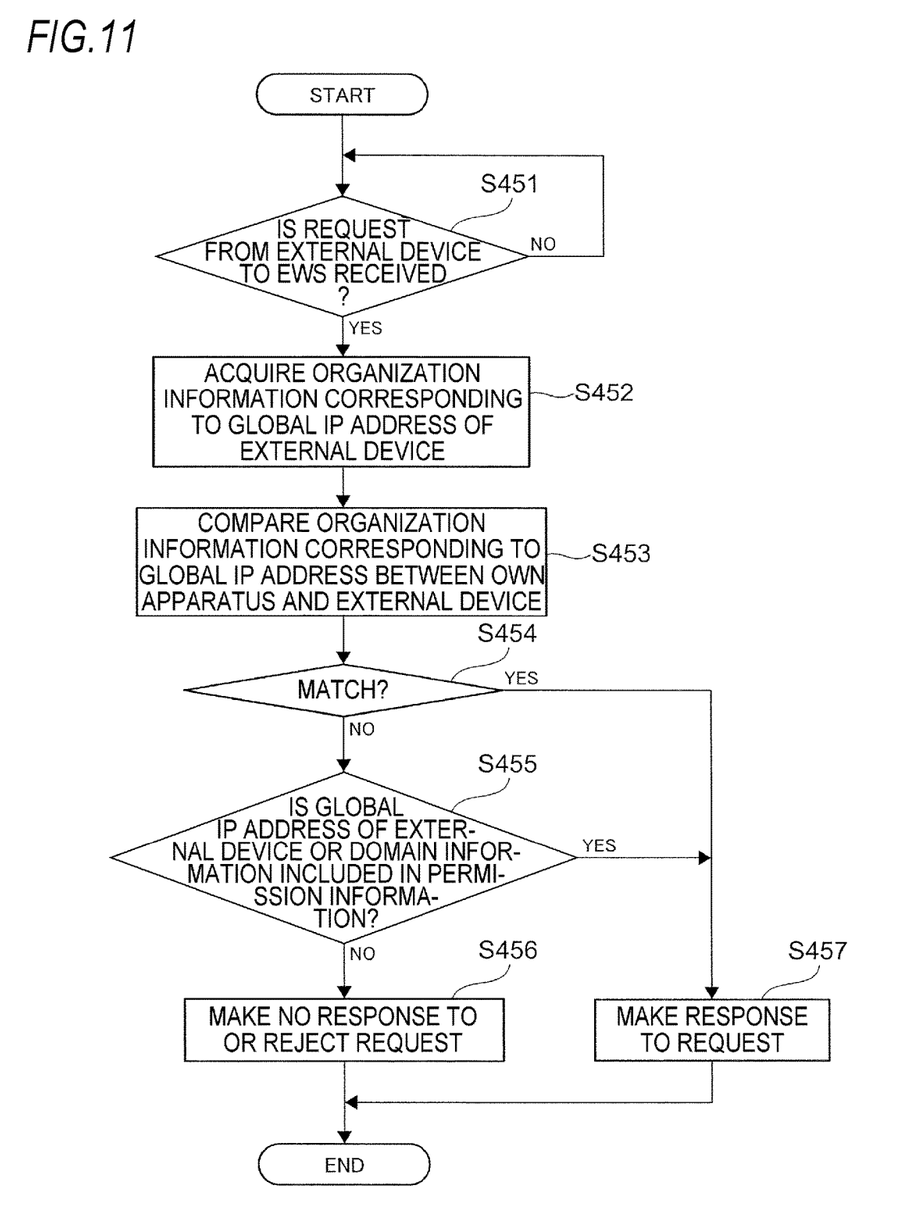
FIG. 11 is a flowchart illustrating an operation example when a request is sent from an external device to the information processing apparatus according to the fourth exemplary embodiment of the present invention.

FIG. 11 is a flowchart illustrating an operation example when a request is sent from the external device to the EWS 21 of the image processing apparatus 10.

As illustrated, in the information processing apparatus 20, first, the organization information acquiring unit 23 waits until receiving an information acquisition request or an information setting request from the external device on the network to the EWS 21 (step 451). Then, upon receiving the request, the organization information acquiring unit 23 acquires the organization information corresponding to the IP address (global IP address) of the external device (step 452). Specifically, the organization information acquiring unit 23 acquires a domain name from the IP address with a reverse DNS protocol and acquires organization information from the domain name with a WHOIS protocol. At this time, by caching the correspondence between the acquired global IP address of the external device and the acquired organization information, it may not be necessary to acquire the organization information by making an inquiry every time a request comes from the external device.

Next, the organization information matching determination unit 25 compares the organization information corresponding to the global IP address of the image processing apparatus 10 with the organization information corresponding to the global IP address of the external device (step 453) to determine whether or not both match with each other (step 454).

When it is determined that both do not match with each other, the response controller 28 refers to the permission information set by the permission information setting unit 27 to determine whether or not the global IP address of the external device or the corresponding domain information is included in the permission information (step 455).

When it is determined that neither the global IP address of the external device nor the corresponding domain information is included in the permission information, the response controller 28 determines that the image processing apparatus 10 is receiving a request from an external device belonging to another organization, and makes no response to or rejects the request (step 456). In the case of rejection, for example, it is sufficient to respond with an HTTP status code 403 (Access Denied).

When it is determined in the step 455 that at least one of the global IP address of the external device and the corresponding domain information is included in the permission information, the response controller 28 determines that the image processing apparatus 10 and the external device belong to different organizations but the image processing apparatus 10 is receiving a request from a permitted global IP address or organization, and makes a response to the request (step 457).

Meanwhile, when it is determined that both match with each other, the response controller 28 determines that the image processing apparatus 10 is receiving a request from an external device belonging to the same organization, and makes a response to the request (step 457). For example, if the request is a request to acquire state information of the image processing apparatus 10, the response controller 28 responds with the state information in association with the EWS 21. Alternatively, if the request is a request to acquire document data in the confidential box of the image processing apparatus 10, the response controller 28 responds with the document data in the confidential box in association with the EWS 21. At this time, if an authentication mode of the image processing apparatus 10 is ON, that is, if authentication is requested for an access from the outside, the authentication may be performed before the response, and the response may be made only when the authentication is successful.

This operation example has been described based on the first exemplary embodiment for the purpose of simplification of description. Exemplary embodiments are not limited thereto. This operation may be based on the second exemplary embodiment or the third exemplary embodiment. For example, when this operation is based on the second exemplary embodiment, the determination in the step 455 may be made prior to making no response to or rejecting a request from the external device in the step 257 of FIG. 6. When it is determined that at least one of the global IP address of the external device and the corresponding domain information is included in the permission information, the response in the step 261 may be made. When this operation is based on the third exemplary embodiment, the determination in the step 455 may be made prior to making no response to or rejecting a request from the external device in the step 357 of FIG. 9. When it is determined that at least one of the global IP address of the external device and the corresponding domain information is included in the permission information, the response in the step 362 may be made.

[Modification]

In the exemplary embodiments, the information processing apparatus 20 has been described as being implemented as a part of the image processing apparatus 10. Exemplary embodiments are not limited thereto. The information processing apparatus 20 maybe realized as a single independent apparatus independent of the image processing apparatus 10.

[Program]

The process performed by the information processing apparatus 20 in the exemplary embodiments is prepared, for example, as a program such as application software.

That is, the program realizing the exemplary embodiments is grasped as a program that causes a computer to realize a function of receiving an access request from another apparatus, and a function of making no response to or rejecting the access request unless a predetermined condition indicating that the other apparatus belongs to an organization to which an own apparatus belongs is satisfied when the IP address of the own apparatus is a global IP address.

The program realizing the exemplary embodiments may be provided not only by a communication unit but also provided in the form of a recording medium such as a CD-ROM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor that is programmed to:
   acquire an organization information from another apparatus; and
   in response to determining that:
      (i) an organization information of the information processing apparatus and an organization information of the another apparatus do not match; and
      (ii) an authentication information set in the information processing apparatus remains to be a default setting,
   make no response to, or reject, an access request from the another apparatus.

2. A non-transitory computer readable storage medium storing a program causing a computer to execute information processing comprising:
acquiring an organization information from another apparatus; and
in response to determining that:
   (i) an organization information of the information processing apparatus and an organization information of the another apparatus do not match; and
   (ii) an authentication information set in the information processing apparatus remains to be a default setting,
making no response to, or rejecting, an access request from the another apparatus.

* * * * *